United States Patent Office 3,032,389
Patented May 1, 1962

3,032,389
SEPARATION OF LITHIUM FROM LITHIUM BEARING MICAS AND AMBLYGONITE
Ludo K. Frevel, Midland, and Leonard J. Kressley, Saginaw, Mich., assignors to The Dow Chemical Company, Midland, Mich., a corporation of Delaware
No Drawing. Filed Feb. 19, 1959, Ser. No. 794,241
2 Claims. (Cl. 23—31)

This invention concerns the separation and recovery of lithium values from lithium-bearing micas, such as lepidolite, and from amblygonite. More specifically, it concerns a process in which a lithium-bearing mica or amblygonite is subjected to high temperature attack with a stream of sulfur trioxide for a relatively short time and to the subsequent aqueous extraction of enriched lithium values from such treated lithium-bearing ore. This application is a continuation-in-part of application Serial No. 575,972 filed April 4, 1956, now abondoned.

Until the present time, lithium values have been separated and recovered from lithium-bearing ores by prolonged fusion processes and complete dissolution of the ore. Thus, tedious, time-consuming reactions and separation processes had to be resorted to in the past in order to recover a purified lithium salt. See, for example, Schieffelin, Manufacture of Lithium from Lepidolite, Jl. Soc. Chem. Ind. 27: 549–550 (1908), and Weidmann U.S. Patent No. 1,544,114, patented June 30, 1925. Furthermore, the ores first had to be finely ground before being processed according to the prior art.

It has now been discovered, in accordance with this invention, that a lithium-bearing mica or amblygonite in coarsely particulate or sub-divided form can be reacted at an elevated temperature ranging from about 600° to about 900° C. with a stream of $SO_3$ for a relatively short time so as to render lithium values water-soluble without at the same time dissolving the ore matrix. Aluminum and iron values are not attacked thereby, rendering subsequent separation and recovery of lithium much less difficult and considerably more satisfactory with respect to high purity and high recovery of lithium salt. The lithium values, as sulfate concentrate, are thereafter dissolved out in water and can be recovered in a highly purified form, such as lithium chloride, by titrating the aqueous concentrate with the requisite amount of aqueous barium chloride to precipitate the sulfate, filtering the chloride solution, evaporating water from the filtrate, and extracting the lithium chloride therefrom with n-amyl alcohol and evaporating the alcohol.

The amount of $SO_3$ used must be sufficient to react with the bound lithium, but otherwise is not critical, since unreacted $SO_3$ can be recovered for re-use. The $SO_3$ can be formed catalytically in known manner, during or immediately before its reaction with the lithium-bearing mica or amblygonite from a mixture of $SO_2$ and $O_2$, advantageously by passing a mixture of $SO_2$ and $O_2$ over a conventional platinum-on-silica gel catalyst or equivalent at 450° C. or above in the usual way. Also, while oxygen will react with $SO_2$ in the presence of iron impurity present in lepidolite and amblygonite at reaction temperatures of 600° to 900° C. to form $SO_3$, $SO_2$ and air will not react appreciably under similar conditions to form $SO_3$, even when excess air over theory is present.

The temperature of reaction ranges from about 600° to 900° C. Below 600° C., dissolution of the ore takes place and iron and aluminum, in particular, are attacked and rendered water-soluble. Above 600° and up to 900° C., however, the ore matrix is not attacked and the iron and aluminum values are not rendered soluble.

The reaction time varies with the batch size and temperature used. Generally one to two hours is sufficient within the temperature range of 600° to 900° C. In any event, a test run suffices to indicate a time sufficient to solubilize the lithium content.

The process of this invention is operable with lithium-bearing micas and amblygonite only. Spodumene, for example, is not operable in this process, even with prior preheating at 1100° C. to transform it to beta-spodumene. When it is attempted to react spodumene or beta-spodumene with $SO_3$ at 600° C. to 900° C., only a negligible amount of lithium is thereby rendered soluble.

The following examples represent specific embodiments of this invention. Parts and percentages therein are by weight. In each example, a quartz reactor provided with a condenser followed by a filter to remove entrained mist was charged with coarse particles of lithium-bearing mica or amblygonite, ¼ inch being the largest dimension. Each charge was treated at about 600° to 900° C. with a stream of $SO_3$ carried by He, or a mixture of $SO_2$ and $O_2$ forming $SO_3$ under conditions of reaction, or with a stream of $SO_3$ per se, the $SO_3$ being in excess of that required to transform the lithium values to $Li_2SO_4$. Any gas which is inert under conditions of reaction, such as helium, neon, argon, nitrogen, etc., can be used as an $SO_3$ carrier. The so-treated charge was transferred to a Soxhlet thimble and leached in water. The aqueous solution so obtained was evaporated to obtain the weight of the salt, and dried at 120° C. Anhydrous lithium chloride was obtained by (1) titrating the salt solution with the requisite quantity of aqueous barium chloride solution to precipitate the sulfate; (2) filtering the resulting chloride solution; (3) evaporating the water from the filtrate so-obtained; (4) extracting the lithium chloride from the resulting residue with n-amyl alcohol; (5) evaporating the alcohol, from the solution, so obtained, as by blowing a gentle stream of dry nitrogen into the alcoholic lithium chloride solution.

EXAMPLE 1

| Time | Charge Temp., ° C. | Operation |
|---|---|---|
| 0 | 550 | Started passing He through 18 g. liquid $SO_3$ at rate of 170 ml./min. |
| 55 mins | 890 | Heat off; $SO_3$ off (15 g. $SO_3$ vaporized). |
| 2 hrs. 5 mins | 850 | |

Weight of lepidolite charge=14.9493 g.
Weight gain of $SO_3$-treated charge=1.5775 g.
Weight of condensate from reactor effluent=0.2540 g.
Weight of dried, $H_2O$-leached residue=13.0444 g.
Weight of extracted salts ($Li_2SO_4 \cdot H_2O$, $KLiSO_4$, etc.)=3.4638 g.

Lithium balance:
  $Li_2O$ content of initial charge=0.623 g.=4.17 wt. percent
  $Li_2O$ content of dried, $H_2O$-leached solid residue=0.070 g.=0.54 wt. percent
  Percent Li removal=88.8%

EXAMPLE 2

| Time | Temp., ° C. | Operation |
|---|---|---|
| 0 | 500 | Started $SO_2$ flow at 0.41 g./min. Started $O_2$ flow at 137 ml./min. 25 °C., 1 atm. $SO_3$ formed in situ. |
| 1 hr. 20 mins | 800 | |
| 2 hrs. 10 mins | 850 | Heating current off, $SO_2$ off, $N_2$ on. |

Weight of lepidolite charge=8.6139 g.
Weight gain of $SO_3$-treated charge=1.2993 g.
Weight of condensate=1.0196 g.

Weight of dried, $H_2O$-leached residue=7.8970 g.
Weight of extracted salts ($Li_2SO_4 \cdot H_2O$, $KLiSO_4$, etc)= 2.7998 g.

Lithium balance:
    $Li_2O$ content of initial charge 0.359 g.=4.17 wt. percent
    $Li_2O$ content of dried, $H_2O$-leached residue=0.0466 g.=0.59 wt. percent
    Percent Li removal=87.0%
    Weight of isolated LiCl from extracted salts=0.8704 g.=0.326 g. $Li_2O$
    Percent Li recovery=90.8%

EXAMPLE 3

| Time | Temp., °C. | Operation |
|---|---|---|
| 0 | 500 | Started $SO_2$ flow at rate of 0.41 g./min. |
| 35 min | 900 | Started $O_2$ flow at rate of 137 ml./min. $SO_3$ formed in situ. |
| 2 hrs. 10 mins | 860 | Heating current off, $SO_2$ off, $N_2$ on. |

Weight of amblygonite=18.1887 g.
Weight gain of $SO_3$-treated charge=2.1763 g.
Weight of dried, $H_2O$-leached residue=15.9296 g.
Weight of extracted salts=5.1189 g.

Lithium balance:
    $Li_2O$ content of charge=2.057 g. $Li_2O$=11.3 percent
    $Li_2O$ content of dried, water-leached residue=0.669 g.=4.2 percent
    Percent Li removal=67.5 percent

EXAMPLE 4

| Time | Temp., °C. | Operation |
|---|---|---|
| 0 | 600 | Started $SO_2$ flow at rate of 0.25 g./min. Started $O_2$ flow at rate of 95 ml./min. 25° C., 1 atm. $SO_3$ formed in situ. |
| 1 hr | 890 | |
| 1½ hrs | 910 | |
| 2 hrs | 890 | Heating current off, $SO_2$ off, $N_2$ on. |

Weight of lepidolite cum quartz=16.0395 g.
Weight gain of $SO_3$-treated charge=1.6060 g.
Weight of dried, $H_2O$-leached residue=13.3941 g.
Weight of extracted salt dried at 150° C.=4.0293 g.

Lithium balance:
    $Li_2O$ content of lepidolite cum quartz=0.5518=3.44 wt. percent
    $Li_2O$ content of dried, $H_2O$-leached residue=0.0575=0.43 wt. percent
    Percent Li removal=89.5%

Among the advantages of the process of this invention over the prior art are (1) the lithium-containing mica or amblygonite need not be finely ground before reaction with $SO_3$; (2) the ore matrix is not attacked and dissolved, thus it is much less difficult to separate lithium from associated impurities; (3) the reaction is not time consuming; (4) aluminum and iron are not dissolved, therefore less reagent $SO_3$ is needed; (5) unreacted $SO_3$ is readily recirculated.

EXAMPLE 5

Crushed lepidolite containing quartz was heated at 600° C. for one hour in a quartz reactor while exposed to a stream of a mixture of $SO_2$ and air (run 1) and at 300° C. for one hour in the presence of a mixture of $SO_2$ and air (run 2). In contrast thereto, runs 3 and 4 utilized $SO_3$ at 600° C. and at 630° C., each for one hour, the $SO_3$ having been prepared catalytically by passing a mixture of $SO_2$ and $O_2$ over a conventional platinum-on-silica-gel catalyst at 450° C. The amount of $SO_2$ oxidized to $SO_3$ was equivalent to the $SO_2$ present in the mixtures of runs 1 and 2. The sulfated lithium values were extracted with water and recovered. In runs 1 and 2, more than sufficient air was present to oxidize the $SO_2$ to $SO_3$ if a catalytic reaction were used. Runs 1 and 2 concern experiments outside the scope of the invention and are included for purposes of comparison.

Results are summarized in the following table.

Table

| | Run 1 (Blank) $SO_2$ 70 ml./min. air 180 ml./min. 600° C. for 1 hr. | Run 2 (Blank) $SO_2$ 70 ml./min. air 180 ml./min 300° C. for 1 hr. | Run 3 $SO_3$ (from $SO_2$ 70 ml./min. and $O_2$ 90 ml./min. catalyzed at 450° C.) 600° C. for 1 hr. | Run 4 $SO_3$ (from $SO_2$ 70 ml./min. and $O_2$ 90 ml./min.) 630° C. for 1 hr. |
|---|---|---|---|---|
| Wt. lepidolite cum quartz, grams | 19.5607 | 14.7432 | 14.7545 | 16.7847 |
| Wt. gain, grams | 0.7497 | 0.0235 | 4.8758 | 5.5076 |
| Wt. dried water-leached charge, grams | 18.7841 | 14.0790 | 12.2704 | 13.9063 |
| Wt. extracted salts, grams | 1.3955 | 0.0560 | 8.9175 | 10.4847 |
| Lithium Balance: | | | | |
| $Li_2O$ content of lepidolite charge, wt. percent | 3.01 | 3.01 | 3.01 | 3.01 |
| Wt. $Li_2O$ in charge, grams | 0.595 | 0.448 | 0.449 | 0.510 |
| Wt. $Li_2O$ in extracted salts | 0.043 | 0.006 | 0.232 | 0.273 |
| Percent $Li_2O$ removal (based on extracted salts) | 7.2 | 1.3 | 52.2 | 53.8 |

What is claimed is:
1. A method of separating lithium values from a lithium ore of the group of lithium-bearing micas and amblygonite which comprises subjecting said lithium-bearing ore to the action of sulfur trioxide at a temperature between 600° and 900° C., in amount and for a time sufficient to transform lithium values to lithium sulfate and recovering enriched lithium values therefrom.

2. A method according to claim 1 in which the so-treated lithium-bearing ore is leached with water to form an aqueous solution containing lithium sulfate.

References Cited in the file of this patent

UNITED STATES PATENTS

| | | |
|---|---|---|
| 876,851 | Wadman | Jan. 14, 1908 |
| 1,402,831 | Brown | Jan. 10, 1922 |
| 1,710,556 | Grisewald | Apr. 23, 1929 |
| 1,742,191 | Arnold | Jan. 7, 1930 |
| 2,016,222 | Bassett | Oct. 1, 1935 |
| 2,516,109 | Ellestad | July 25, 1950 |

OTHER REFERENCES

Welch: "Scientific Journal of Royal College of Science," vol. 14, pages 12–18, Royal College of Science, London, 1944.